United States Patent
Hirata et al.

(10) Patent No.: US 11,248,984 B2
(45) Date of Patent: Feb. 15, 2022

(54) METHOD FOR LEAK TESTING AND REFERENCE LEAK DEVICE FOR LEAK TESTING

(71) Applicant: FUKUDA CO., LTD., Tokyo (JP)

(72) Inventors: Mao Hirata, Tokyo (JP); Tsutomu Hara, Tokyo (JP); Naoto Izumo, Tokyo (JP); Masaharu Sugihara, Tokyo (JP)

(73) Assignee: Fukuda Co., Ltd., Tokyo (JP)

( * ) Notice: Subject to any disclaimer, the term of this patent is extended or adjusted under 35 U.S.C. 154(b) by 440 days.

(21) Appl. No.: 16/301,906

(22) PCT Filed: Feb. 28, 2017

(86) PCT No.: PCT/JP2017/007664
§ 371 (c)(1),
(2) Date: Nov. 15, 2018

(87) PCT Pub. No.: WO2017/208543
PCT Pub. Date: Dec. 7, 2017

(65) Prior Publication Data
US 2019/0285507 A1    Sep. 19, 2019

(30) Foreign Application Priority Data

May 31, 2016 (JP) .............................. JP2016-108114

(51) Int. Cl.
*G01M 3/32* (2006.01)
*G01M 3/26* (2006.01)
(Continued)

(52) U.S. Cl.
CPC ............ *G01M 3/3263* (2013.01); *G01M 3/02* (2013.01); *G01M 3/26* (2013.01); *G01M 3/3281* (2013.01); *G01M 3/007* (2013.01)

(58) Field of Classification Search
CPC ........ G01M 3/3263; G01M 3/26; G01M 3/02; G01M 3/3281; G01M 3/007
See application file for complete search history.

(56) References Cited

U.S. PATENT DOCUMENTS

| | | | |
|---|---|---|---|
| 4,045,996 A | 9/1977 | Sopcak et al. | |
| 2002/0100709 A1* | 8/2002 | Shibata | B65D 75/327 206/469 |

(Continued)

FOREIGN PATENT DOCUMENTS

| | | |
|---|---|---|
| JP | 4122318 Y1 | 11/1966 |
| JP | 01276036 A | 11/1989 |

(Continued)

OTHER PUBLICATIONS

International Search Report of PCT/JP2017/007664 of the International Searching Authority dated Dec. 4, 2018 (2 pages).
(Continued)

*Primary Examiner* — Herbert K Roberts
*Assistant Examiner* — John M Royston
(74) *Attorney, Agent, or Firm* — Jodi A. Reynolds, Esq.; Harter Secrest & Emery LLP (57) ABSTRACT

A method for leak testing includes a leak testing step and a reference leak step. In the leak testing step, a hollow work 20 as a test object is encapsulated in a work capsule 11. A test pressure is supplied to the work capsule 11 through a path 2a connected to the work capsule. A variation of pressure inside the work capsule 11 is detected in a condition in which the path 2a is shut-off, and a judgment is made whether a leakage through the work is generated based on the detected output. In the reference leak step, a reference leak device 30 having a known pinhole 31a is mounted on a work 20' for reference leakage that is same as the work 20 as the test object. The work 20' for reference leakage is encapsulated in the work capsule 11. The test pressure is
(Continued)

supplied to the work capsule 11 via the path 2a, and a reference leakage is generated in the work 20' for reference leakage via the reference leak device 30 in a condition in which the path 2a is shut-off. A variation of pressure inside the work capsule 11 accompanying the reference leakage is detected.

5 Claims, 6 Drawing Sheets

(51) Int. Cl.
*G01M 3/02* (2006.01)
*G01M 3/00* (2006.01)

(56) References Cited

U.S. PATENT DOCUMENTS

2004/0173013 A1* 9/2004 Kobayashi ......... F02M 25/0818
73/114.41

2006/0144120 A1 7/2006 Tang et al.
2015/0276543 A1 10/2015 Decker

FOREIGN PATENT DOCUMENTS

| JP | 09-072817 A | 3/1997 |
|----|-------------|--------|
| JP | 09068474 A | 3/1997 |
| JP | 2002148135 A | 5/2002 |
| JP | 2003149076 A | 5/2003 |
| JP | 2006189425 A | 7/2006 |
| JP | 2015532431 A | 11/2015 |

OTHER PUBLICATIONS

International Preliminary Report on Patentability of PCT/JP2017/007664 of the International Searching Authority dated Dec. 13, 2018 (8 pages).

Japanese Patent Office, Office Action in corresponding JP Application No. JP2018-520660, dated Nov. 24, 2020.

* cited by examiner

METHOD FOR LEAK TESTING AND REFERENCE LEAK DEVICE FOR LEAK TESTING

FIELD OF THE INVENTION

The present invention relates to a method for leak testing including a reference leak step and a reference leak device used in the leak testing.

BACKGROUND OF THE INVENTION

A known method for evaluating hermeticity of a hollow work as a test object includes applying a test pressure to the work and detecting leakage. As disclosed in Patent Document 1 (Japanese Unexamined Patent Application Publication No. H9-72817), for example, a leak testing apparatus used in the method includes two branch paths connected to a downstream end of a common path connected to a pressure source. A hollow work and a master container are respectively connected to the downstream ends of the branch paths. Valves are respectively disposed in the branch paths. A differential pressure sensor is connected between the branch paths on a downstream side with respect to the valves.

An embodiment in which a work is directly connected to a branch path is disclosed in Patent Document 1. It is also known to connect a work capsule to a branch path and encapsulate a hollow work in the work capsule. The latter case is taken as an example and described below.

In a condition in which two branch paths are shut-off by closing the valves after providing a positive test pressure from a pressure source, for example, a difference between a pressure inside a work capsule and a pressure in a master container is detected by a differential pressure sensor. If there is a defect such as a pin hole in the work, the test pressure inside the work capsule leaks into the work, and therefore, the pressure in the work capsule is reduced. If a differential pressure detected by the deferential pressure sensor exceeds a threshold value, the work is judged to be defective, having a pinhole.

As disclosed in Patent Document 1, a reference leak device is connected to the branch path of the leak testing apparatus on the work side. The reference leak device is configured so as to provide a predetermined quantity of atmospheric-pressure-converted leakage under the test pressure. Using the leak testing apparatus, a reference leak step is performed at a time of delivery to a user and periodically thereafter. In the reference leak step, as with the leak testing step mentioned above, after providing the test pressure to the work capsule and the master container and shutting-off the two branch paths, a reference leakage is generated by the reference leak device. Thereby, the pressure on the work capsule side is reduced, and the differential pressure is detected by the differential pressure sensor.

The differential pressure detected in the reference leak step corresponds to a known atmospheric-pressure-converted leakage quantity, and can be used as a reference data for the leak testing. For example, if an atmospheric-pressure-converted leakage quantity in the reference leak step is within an allowable limit value, the detected differential pressure can be used as a threshold value for judging acceptance or rejection of the work in a leak testing step.

SUMMARY OF THE INVENTION

Problem to be Solved by the Invention

In the reference leak step of the Patent Document 1, a dedicated reference leak device that is separate from the work capsule is connected to the leak testing apparatus. In the reference leak step, the air of the test pressure inside the work capsule is released to the atmosphere via the reference leak device. However, in an actual leak testing step, the air of the test pressure inside the work capsule moves into the work via the pinhole of the work. Therefore, a variation of detected pressure in the reference leak step does not exactly correspond to a variation of detected pressure in the leak testing step. Moreover, the reference leak device is precise and complicated, and therefore, it is not easy to keep the reference leak device from dirt and dust.

Solution to the Problem

To solve the problems mentioned above, the present invention provides a method for leak testing including a leak testing step, the leak testing step including: encapsulating a hollow work as a test object in a work capsule; supplying a test pressure to the work capsule through a path connected to the work capsule; detecting a variation of pressure inside the work capsule in a condition in which the path is shut-off; and judging whether a leakage through the work is generated based on the detected output in the detecting step, the method further including a reference leak step, the reference leak step including: mounting a reference leak device having a known pinhole on a work for reference leakage that is same as the work as the test object; encapsulating the work for reference leakage in the work capsule; supplying the test pressure to the work capsule via the path; generating a reference leakage in the work for reference leakage via the reference leak device in a condition in which the path is shut-off; and detecting a variation of pressure inside the work capsule accompanying the reference leakage.

According to the method mentioned above, the reference leakage can be generated in the work capsule in a condition similar to a case in which the work as the test object has a pinhole. The detected pressure variation inside the work capsule during the reference leakage can be used as reliable reference data for the leak testing.

Preferably, an opening is formed in the work for reference leakage prior to the reference leak step, the reference leak device is attached to a portion surrounding the opening, and in the reference leak step, a reference leakage is generated via the pinhole of the reference leak device and the opening.

The method mentioned above is particularly effective when the work has no existing opening and the work is formed of a sheet or a bag.

In another aspect of the present invention, there is provided a reference leak device for leak testing including: a base material having a pinhole formed therein; and an attachment structure to a work, the attachment structure disposed in a peripheral edge portion of the base material.

According to the features mentioned above, a structure of the reference leak device can be simplified.

Preferably, the base material and the attachment structure have flexibility.

According to the features mentioned above, the reference leak device can be easily mounted to the work.

Preferably, the reference leak device further includes filters respectively attached to opposite sides of the base material and covering the pinhole.

According to the features mentioned above, the minute pinhole can be prevented from being clogged with dirt and dust.

Preferably, the base material is thin and has flexibility, the attachment structure includes a seal material that is thin and has flexibility and has an opening formed in a middle thereof, a peripheral edge portion of the base material is attached to an inner annular region of one of surfaces of the seal material, and an adhesive layer for adhering to the work is formed in an outer annular region of one of the surfaces of the seal material.

According to the features mentioned above, the reference leak device can be easily mounted to the work.

Preferably, an auxiliary seal material is removably adhered to the other surface of the seal material on a side opposite to the adhesive layer and the auxiliary seal material covers the opening of the seal material.

According to the features mentioned above, the work for reference leakage having the auxiliary seal attached thereto can be tested for leakage as a work without leakage, and the obtained detected output can be used as reference data for the leak testing. Moreover, by removing the auxiliary seal, the work can be used as the work for reference leakage having the reference leak device, and the obtained detected output during the reference leakage can be used as other reference data for the testing.

Advantageous Effects of the Invention

According to the present invention, a reference value for leak testing can be obtained easily with a high degree of accuracy.

DESCRIPTION OF THE PREFERRED EMBODIMENTS

A first embodiment of the present invention will be described hereinafter with reference to FIGS. 1 to 6. Firstly, a leak testing apparatus to which the present invention is applied is described with reference to FIGS. 1A and 1B. Basic features of the leak testing apparatus are well known in the art.

Figure 1A:
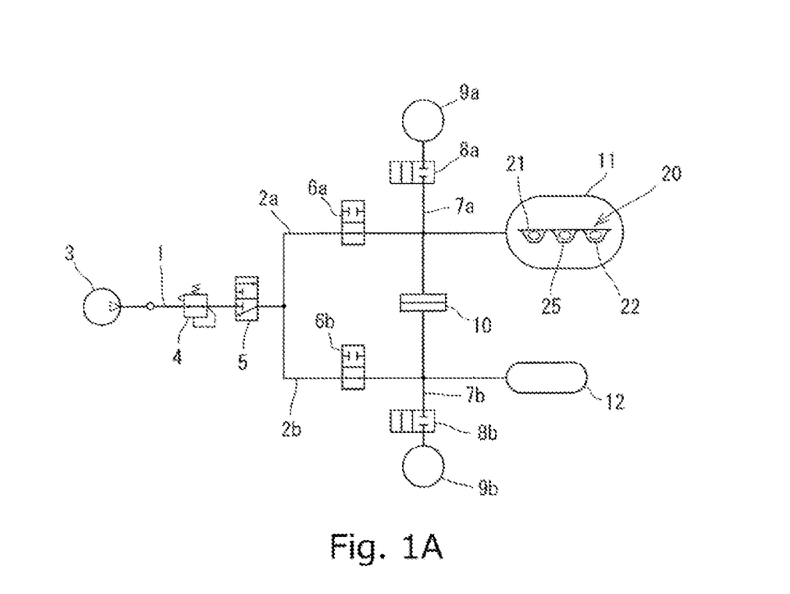
FIG. 1A is a circuit configuration diagram of a leak testing apparatus for implementing a method for leak testing according to the present invention, showing a work as a test object encapsulated in a work capsule.
Figure 1B:
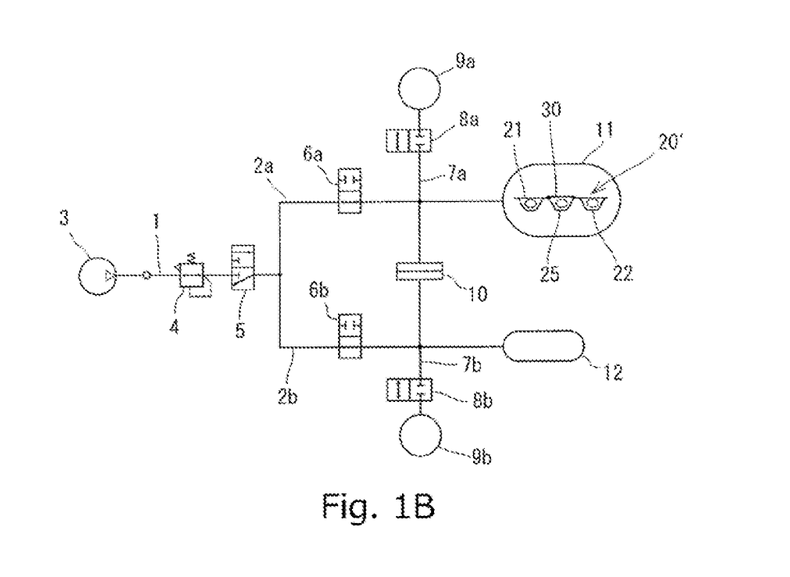
FIG. 1B is a circuit configuration diagram of the leak testing apparatus, showing a work having a reference leak device according to a first embodiment of the present invention mounted thereto encapsulated in the work capsule.
Figure 2:
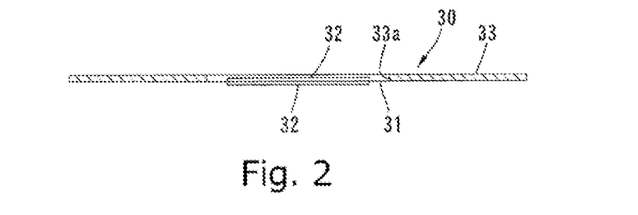
FIG. 2 is a cross-sectional view of the reference leak device.
Figure 3:
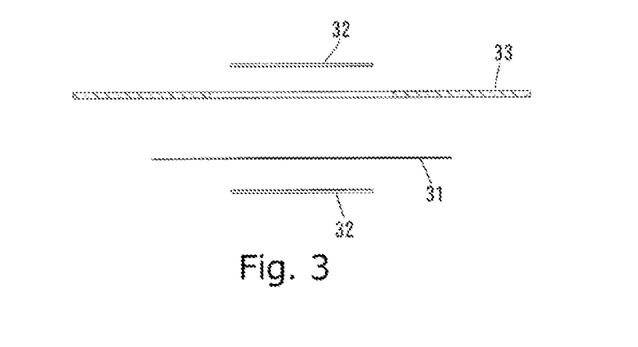
FIG. 3 is an exploded cross-sectional view of the reference leak device.
Figure 4:
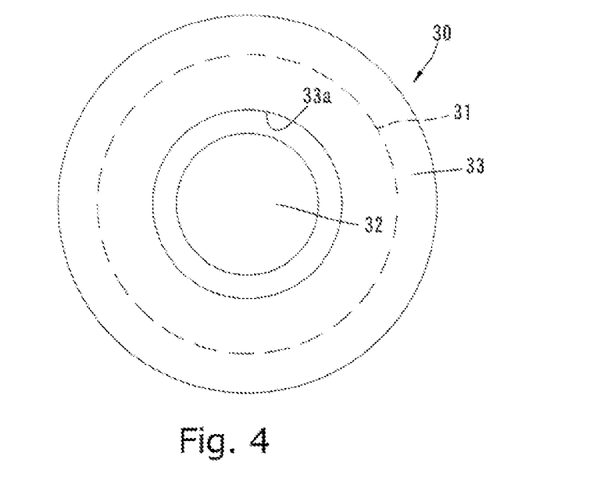
FIG. 4 is a plan view of the reference leak device.

The leak testing apparatus includes a common path 1, a branch path 2a and a branch path 2b both connected to a downstream end of the common path 1. A pressure source 3 is connected to an upstream end of the common path 1. The pressure source 3 used in this embodiment is a pressurized air source. A regulator 4 and a three-way valve 5 are disposed in the common path 1. The three-way valve 5 is disposed on a downstream side with respect to the regulator 4.

Valves 6a, 6b (on-off valves or two-way valves) are respectively disposed in the branch paths 2a, 2b. Auxiliary paths 7a, 7b are respectively connected to the branch paths 2a, 2b on downstream sides with respect to the valves 6a, 6b. Valves 8a, 8b and tanks 9a, 9b having a same volume are respectively connected to the auxiliary paths 7a, 7b.

Two ports of a differential pressure sensor 10 (pressure sensor) are respectively connected to the branch paths 2a, 2b on the downstream sides with respect to the on-off valves 6a, 6b. Thereby, a differential pressure between the branch paths 2a, 2b can be detected.

A work capsule 11 is connected to a downstream end of the branch path 2a and a master container 12 is connected to the branch path 2b. The work capsule 11 is composed of two openable and closable capsule half bodies, and is adapted to be sealed in a condition having the work received therein as will be described later. The master container 12 that is shown in a frame format in the drawings may be an airtight container having a same volume as the work capsule 11. The master container 12 may have a same structure as the work capsule 11. A work that is same as a test object and that is confirmed to have no leakage is received in the master container 12.

The valves 5, 6a, 6b, 8a, 8b are sequence controlled by a controller that is not shown. The controller also controls opening and closing of the work capsule 11 and makes judgment of acceptance or rejection of the work (judgment of leakage or non-leakage) based on the differential pressure detected by the differential pressure sensor 10.

Figure 6:
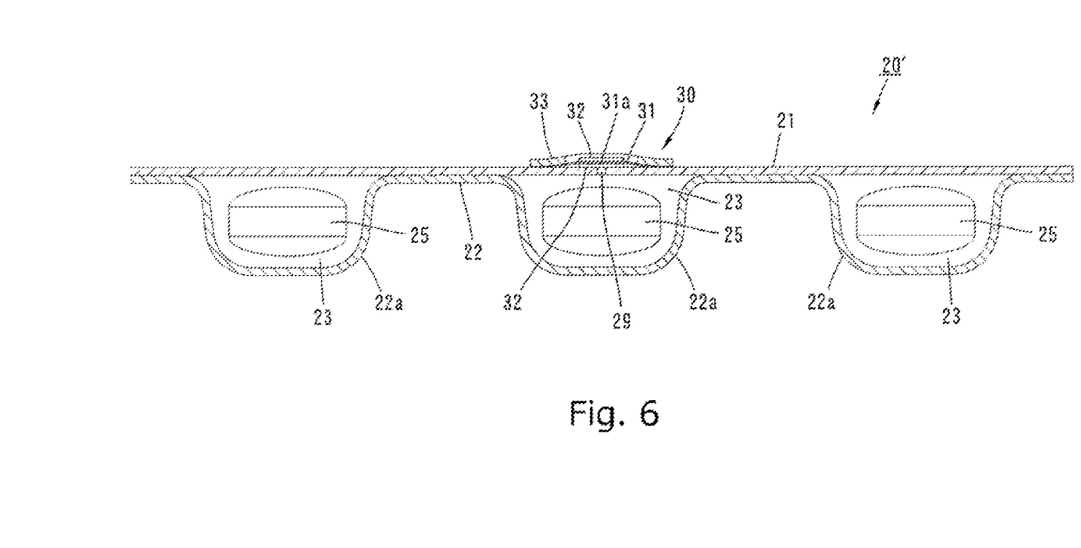
FIG. 6 is a cross-sectional view of the work having the reference leak device mounted thereto, shown with a thickness thereof exaggerated.

The hollow work as the test object is a package 20 for medical use in this embodiment. FIG. 6 shows a package 20' as a work for reference leakage (or simulated leakage) to be described later. The package 20' for reference leakage and the package 20 as the test object are same in a basic structure. The package 20 as the test object will be described below with reference to FIG. 6.

The package 20 as the test object includes a base sheet 21 made of resin and a transparent cover sheet 22 made of resin welded together. The cover sheet 22 has a plurality of protrusions 22a. Sealed spaces 23 are respectively formed by the protrusions 22a and the base sheet 21. A tablet 25 is received in the sealed space 23.

The package 20' for the reference leakage has a reference leak device 30 to be described later mounted thereon and the base sheet 21 thereof has a hole 29 formed therein.

In a leak testing step, a leak/non-leak judgment is made of the package 20 as the test object in a state of being received in the work capsule 11 as shown in FIG. 1A. While the leak testing step includes a small leakage detection step and a large leakage detection step, the present invention is related to the small leakage detection step. A brief description of the leak testing step is given below.

Firstly, the package 20 is received in the work capsule 11 and encapsulated therein.

Next, the three-way valve 5 is opened, and thereby, a test pressure from the pressure source 3 is supplied to the work capsule 11 and the master container 12 via the branch paths 2a, 2b. Next, the valves 6a, 6b are closed, and thereby, portions of the branch paths 2a, 2b on the downstream side with respect to the valves 6a, 6b are isolated from each other.

Next, the process proceeds to the small leakage detection step. Specifically, a differential pressure is detected by the differential pressure sensor 10 after a passage of a predetermined length of time following the closure of the valves 6a, 6b, and the differential pressure is compared with a first threshold value. If the package 20 has a defect such as a small pinhole, a pressurized air in the work capsule 11 enters the sealed space 23 of the package 20. As a result, a pressure inside the work capsule 11 is gradually reduced from the test pressure. On the other hand, the test pressure is maintained in the master container 12. As a result, a difference is generated between the pressure inside the work capsule 11 and the pressure inside the master container 12. The differential pressure (pressure variation inside the work capsule 11) is detected by the differential pressure sensor 10. If the detected differential pressure is greater than the first threshold value, the package 20 is judged to have a small leakage. If the detected differential pressure is smaller than the first threshold value, the package 20 is judged not to have a small leakage.

Next, the large leakage detection step is performed. It is because if the package 20 has a big pinhole, the pressurized air of the test pressure enters the sealed space 23 (large leakage) at the same time with the supplying of the test pressure, a leakage cannot be detected by the small leakage detection step.

In the large leakage detection step, the valves 8a, 8b are opened, and the tanks 9a, 9b are respectively made communicable with the branch paths 2a, 2b. Since pressures inside the tanks 9a, 9b are atmospheric pressure, air of the test pressures in the work capsule 11 and the master container 12 respectively move to the tanks 9a, 9b, and the pressures are divided. A pressure in the path 2a on the work side is higher than a pressure in the path 2b on the master side by a pressure corresponding to the pressurized air inside the sealed space 23 having the large leakage. The differential pressure detected by the differential pressure sensor 10 is compared with a second threshold value. If the differential pressure exceeds the second threshold value, the package 20 is judged to have a large leakage.

Next, a reference leak step (or a simulated leak step) is described below. The reference leak step is performed at a time of delivery of the leak testing apparatus and at a time of a periodical inspection or the like in order to evaluate performance of the leak testing apparatus, to set a threshold value at the small leakage detection step or to obtain reference data for calibrating detection output.

In the present invention, in place of connecting a dedicated reference leak device to the branch circuit 2a of the leak testing apparatus on the work side, the reference leak device 30 (or a simulated leak device) is mounted on the package 20' for reference leakage to be received in the work capsule 11. A detailed description of the reference leak device 30 is given below.

As shown in FIGS. 2 to 5, the reference leak device 30 includes a base material 31 having a circular configuration, filters 32 having a circular configuration and attached to opposite sides of the base material 31 and a seal material 33 having an annular configuration and attached to a peripheral edge portion of the base material 31. The reference leak device 30 is thin and flexible.

In the present embodiment, the base material 31 is made of a thin film of metal such as stainless steel having a diameter of 9.5 mm and a thickness of 15 μm, for example. The base material 31 may be made of another metal or glass, resin, ceramic, or the like. A pinhole 31a is formed in a middle portion of the base material 31. A diameter of the pinhole 31a is from 1 μm to several ten μm, for example.

Figure 5:
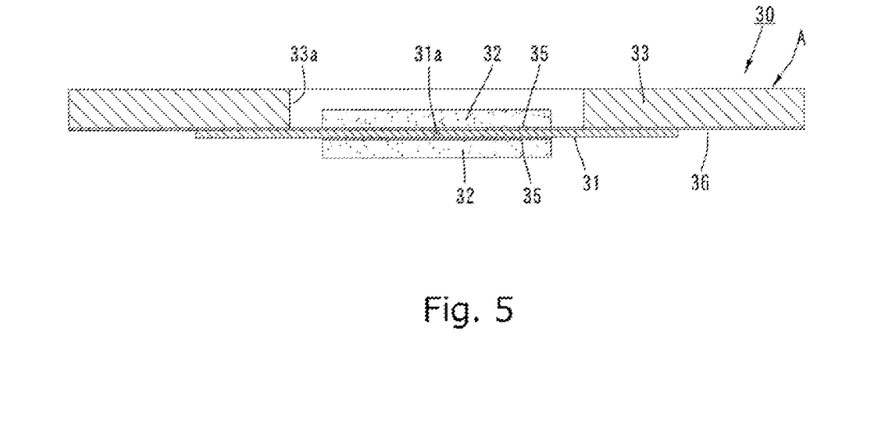
FIG. 5 is an enlarged cross-sectional view of the reference leak device, shown with thicknesses of components exaggerated and a diameter of a pinhole exaggerated.

The pair of the filters 32 are provided to prevent the minute pinhole 31a of the base material 31 from being clogged by dirt and dust. The filters are made of resin stretched into a porous state or a non-woven fabric made of glass fibers, resin fibers, ceramic fibers or the like. In this embodiment, the filter 32 has a diameter of 4.5 mm and a thickness of 0.1 mm, for example.

A peripheral edge portion of the filter 32 is attached to the base material 31 by an adhesive layer 35. The adhesive layer 35 is not disposed in the middle portion of the base material 31 including the pinhole 31a.

The seal material 33 is made of resin and has an opening 33a in a middle portion thereof. One of the filters 32 is disposed inside the opening 33a.

The seal material 33 has an outer diameter of 14.5 mm, an inner diameter of 5.8 mm and a thickness of 0.2 mm, for example. An adhesive layer 36 is coated on an entirety of one surface of the seal material 33. The peripheral edge portion of the base material 31 is adhered to an inner annular region of the seal material 33 by the adhesive layer 36. The adhesive layer 36 is exposed in an outer annular region of the seal material 33.

In this embodiment, the seal material 33 and the adhesive layer 36 are provided as an attachment structure A for attaching the base material 31 to the package 20' for reference leakage. The adhesive layer 36 in the outer annular region of the seal material 33 may be formed on the other surface of the base material 31.

Dimensions of the components of the reference leak device 30 mentioned above may be determined as appropriate according to a work as a test object.

The pinhole 31a of the reference leak device 30 has known properties. Specifically, in the reference leak device 30, an atmospheric-pressure-converted leakage quantity is measured beforehand by applying the test pressure. Alternatively, the reference leak devices 30 having a variety of leakage properties may be prepared and selected according to the work. Alternatively, dimensions of the pinhole 31a may be measured beforehand in place of the leakage properties, and among the reference leak devices 30 respectively having pinholes 31a of various dimensions, a suitable reference leak device 30 may be selected according to the work.

As shown in FIG. 6, the reference leak device 30 having the features mentioned above is attached to the package 20' for reference leakage. The package 20' used herein is confirmed to be free from defect such as a pinhole. A hole 29 is formed beforehand in a selected portion of the base sheet 21 of the package 20', which is a portion corresponding to one of the plurality of sealed spaces 23. A diameter of the hole 29 is much greater than that of the pinhole 31a of the reference leak device 30. The outer annular region of the seal material 33 of the reference leak device 30 is attached to the selected portion of the base sheet 21 via the adhesive layer 36. Due to the seal material 33, the sealed space 23 is communicable with an outside only through the hole 29 of the base sheet 21 and the pinhole 31a of the reference leak device 30.

In the reference leak step, the package 20' having the reference leak device 30 mounted thereto is encapsulated in the work capsule 11 of the leak testing apparatus, and a step similar to that of the small leakage detection step in the leak testing step is performed.

A differential pressure detected by the differential pressure sensor 10 in the reference leak step corresponds to the dimensions of the pinhole 31a or the atmospheric-pressure-converted leakage quantity associated with the pinhole 31a. Outputs detected by the differential pressure sensor 10 in the reference leak step are used as reference data for the leak testing. Specifically, the outputs are used for evaluating performance of the leak testing apparatus, calibrating detection output in the small leakage detection step and for determining a threshold value in the small leakage detection step, for example. Specific explanation will be given below.

In a case where the pinhole 31a of the reference leak device 30 generates a leak corresponding to an allowable limit of the atmospheric-pressure-converted leakage quantity of the package 20, the differential pressure detected in the reference leak step can be used as a threshold value for the small leakage detection step.

The reference leak step is performed using the reference leak devices 30 having different leakage properties, and variations of the detected differential pressures over time are stored as data. In the leak testing step, a variation of the detected differential pressure over time is compared with the data in the reference leak step and an atmospheric-pressure-converted leakage quantity is calculated and the calculated value is compared with the threshold value.

As mentioned above, by directly mounting the reference leak device 30 to the package 20' for reference leakage same as the package 20 as the test object, the reference leakage in the reference leak step can be executed in a condition similar to the leakage from the pinhole of the package 20 in the small leakage detection step of the leak testing step.

Figure 7:
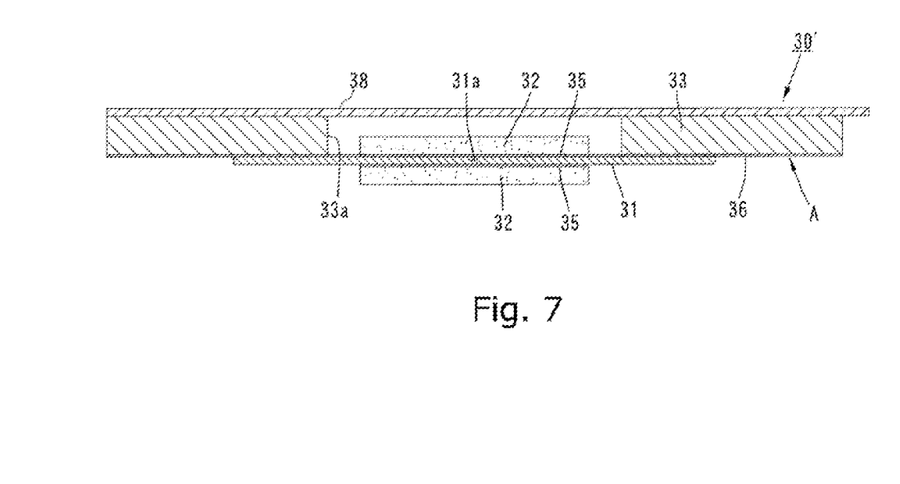
FIG. 7 is a view corresponding to FIG. 5, showing a reference leak device according to a second embodiment of the present invention.

Various embodiments can be adopted as the reference leak device used in the present invention. A reference leak device 30' according to a second embodiment is shown in FIG. 7. A thin auxiliary seal material 38 made of resin, for example, is attached to a surface (surface on an opposite side to a base material 31) of a seal material 33 in the reference leak device 30'. In a condition where the reference leak device 30' is attached to a package 20, an opening 33a of the seal material 33 is closed by the auxiliary seal material 38, and a pinhole 31a of the base material 31 is shut-off from an outside. The package 20 with the reference leak device 30' is encapsulated in a work capsule 11 as a package without leakage, and a differential pressure data detected by a differential pressure sensor 10 for a package without leakage can be obtained in the small leakage detection step mentioned above. In a case where a reference leak step is performed, the auxiliary seal material 38 is removed from the reference leak device 30' and the reference leak device 30' is used in a similar manner to the first embodiment.

Figure 8:
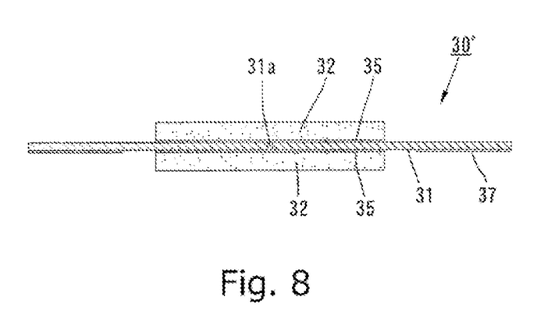
FIG. 8 is a view corresponding to FIG. 5, showing a reference leak device according to a third embodiment of the present invention.

A seal material 33 is not used in a reference leak device 30" according to a third embodiment shown in FIG. 8. In the reference leak device 30", a peripheral edge portion of the base material 31 is directly attached to a package 20 via an adhesive layer 37. In this embodiment, the adhesive layer 37 is provided as an attachment structure.

Application of the present invention is not limited to the leak testing apparatus shown in FIGS. 1A and 1B. The present invention may be applied to various kinds of leak testing apparatus. A leak testing apparatus shown in FIG. 9 does not include a master container. To describe it briefly, in the leak testing apparatus, a pressure source 3 is connected to an upstream end of a main path 1A and a work capsule 11 is connected to a downstream end of the main path 1A. A regulator 4 and valves 13, 14 are disposed on the main path 1A in this order toward the downstream side and a tank 15 is connected to a portion of the main path 1A between the valves 13, 14. A pressure in the tank 15 can be detected by a pressure sensor 16.

Figure 9:
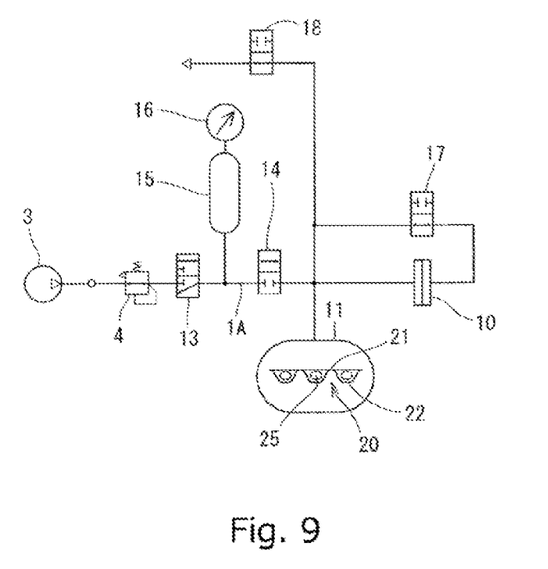
FIG. 9 is a circuit configuration diagram of another leak testing apparatus for implementing the method for leak testing according to the present invention.

One port of a differential pressure sensor 10 is connected to the main path 1A on the downstream side with respect to the valve 14 and the other port is connected to the main path 1A via a valve 17. The downstream side of the main path 1A with respect to the valve 14 is communicable with the atmosphere via an exhaust valve 18.

In a leak testing step, a pressure higher than a test pressure is supplied to the tank 15 by opening the valve 13 and closing the valve 14. Next, the pressure inside the tank 15 is divided to the downstream side with respect to the valve 14 by opening the valve 14 in a condition in which the valve 17 is open and a valve 18 is closed, and the divided pressure is detected by the pressure sensor 16. When the detected divided pressure does not reach the test pressure, a judgment is made that the package 20 has a large leakage. When the detected divided pressure is equal to the test pressure, a judgment is made that the package 20 does not have a large leakage and the process proceeds to a small leakage detection step. In the small leakage detection step, the on-off valve 17 is closed and a differential pressure is detected by the differential pressure sensor 10. Based on the differential pressure, a leak/non-leak judgment is made with respect to the small leakage in a similar manner to the first embodiment. A reference leak step is performed in a similar manner to the small leakage detection step.

The present invention is not limited to the embodiments described above, and various modifications can be adopted without departing from the scope and spirit of the invention.

The pressure source may supply a negative pressure close to vacuum.

The work as the test object is not limited to the package for the medical use, but may be a package for foods. Even when the package is a soft bag, the reference leak device of the present invention can be attached well.

The reference leak device may not have flexibility.

INDUSTRIAL APPLICABILITY

The present invention may be applied to a leak testing performed with a work as a test object encapsulated in a work capsule.

The invention claimed is:

1. A method for leak testing comprising a leak testing step, the leak testing step comprising:
   encapsulating a hollow work as a test object in a work capsule;
   supplying a test pressure to the work capsule through a path connected to the work capsule;
   detecting a variation of pressure inside the work capsule in a condition in which the path is shut-off; and
   judging whether a leakage through the work is generated based on the detected output in a detecting step,
   the method further comprising a reference leak step, the reference leak step comprising:
   mounting a reference leak device having a known pinhole on a work for reference leakage that is same as the work as the test object;
   encapsulating the work for reference leakage in the work capsule;
   supplying the test pressure to the work capsule via the path;
   generating a reference leakage in the work for reference leakage via the reference leak device in a condition in which the path is shut-off; and detecting a variation of pressure inside the work capsule accompanying the reference leakage.

2. The method for leak testing according to claim 1, wherein an opening larger than the pinhole is formed in the work for reference leakage prior to the reference leak step, the reference leak device is attached to a portion surrounding the opening, and in the reference leak step, a reference leakage is generated via the pinhole of the reference leak device and the opening.

3. The method for leak testing according to claim 2, wherein the reference leak device comprises a base material and filters respectively attached to opposite sides of the base material and covering the pinhole, wherein each of the filters is attached to the base material at a peripheral portion of the filter by an adhesive layer, and the adhesive layer is not disposed in a middle portion of the base material in which the pinhole is formed.

4. The method for leak testing according to claim 3, wherein the reference leak device further comprises a seal material that is thin and has flexibility and has an opening formed in a middle thereof, a peripheral edge portion of the base material is attached to an inner annular region of one of surfaces of the seal material, and an outer annular region of the one of surfaces of the seal material is attached to the work for reference leakage.

5. The method for leak testing according to claim 2, wherein the work is a package, the package includes a base sheet made of resin and a transparent cover sheet made of resin welded to the base sheet, the cover sheet includes a plurality of protrusions, sealed spaces are formed by the protrusions and the base sheet,     an opening is formed in the base sheet of the work for reference leakage at a portion corresponding to one of the sealed spaces, the reference leak device is attached to the base sheet, and     the one of the sealed spaces of the work for reference leakage is communicable with outside only through the opening of the base sheet and the pinhole of the reference leak device.

\* \* \* \* \*